INVENTOR.
ROBIN K. RANSONE

BY

Arthur R. Parker
ATTORNEY
AGENT

Sept. 15, 1970  R. K. RANSONE  3,528,605
HOVER PERFORMANCE COMPUTER
Filed March 25, 1968  5 Sheets-Sheet 2
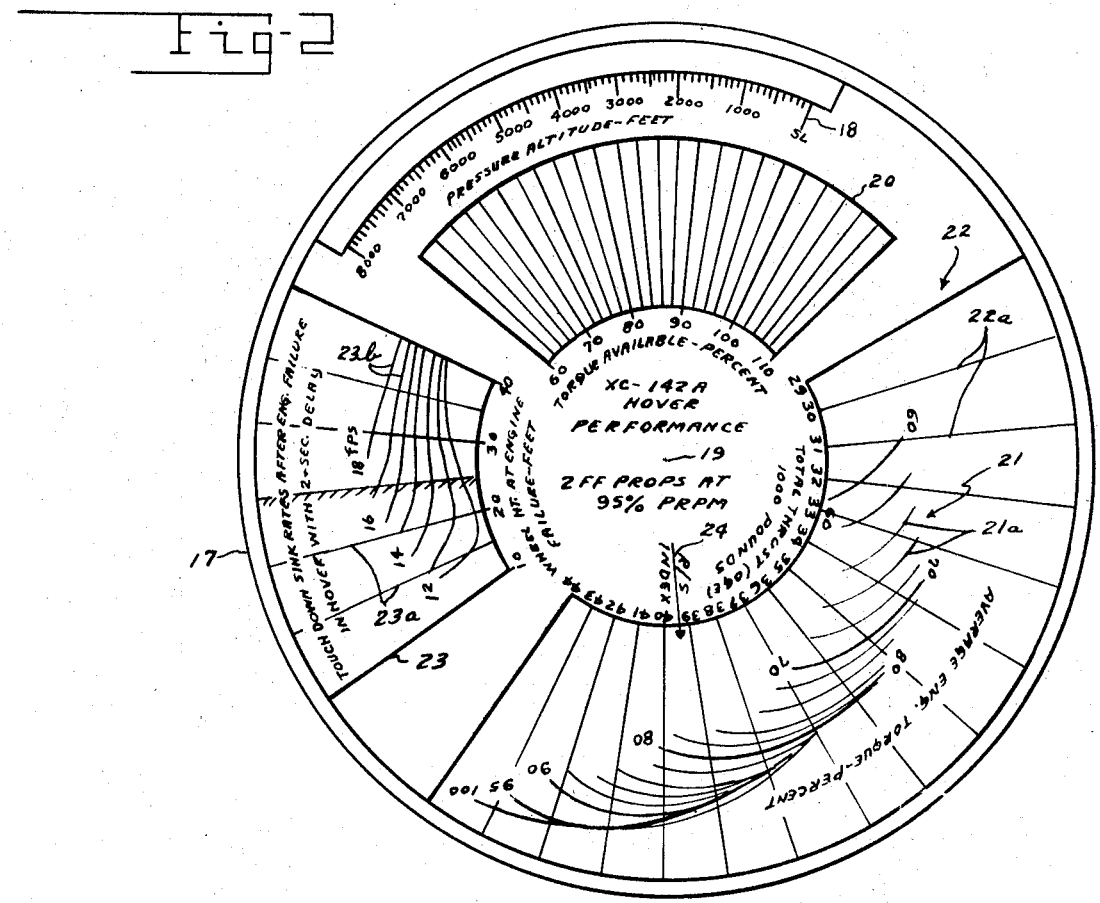
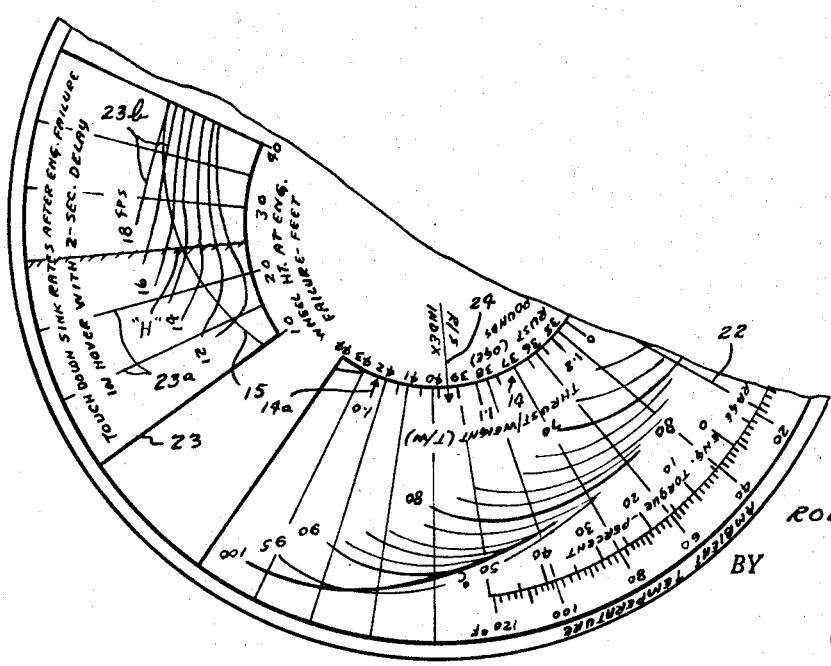
INVENTOR.
ROBIN K. RANSONE
BY
ATTORNEY
Arthur R. Parker
AGENT Sept. 15, 1970  R. K. RANSONE  3,528,605
HOVER PERFORMANCE COMPUTER Filed March 25, 1968  5 Sheets-Sheet 3

INVENTOR.
ROBIN K. RANSONE
BY
ATTORNEY
Arthur R. Parker
AGENT

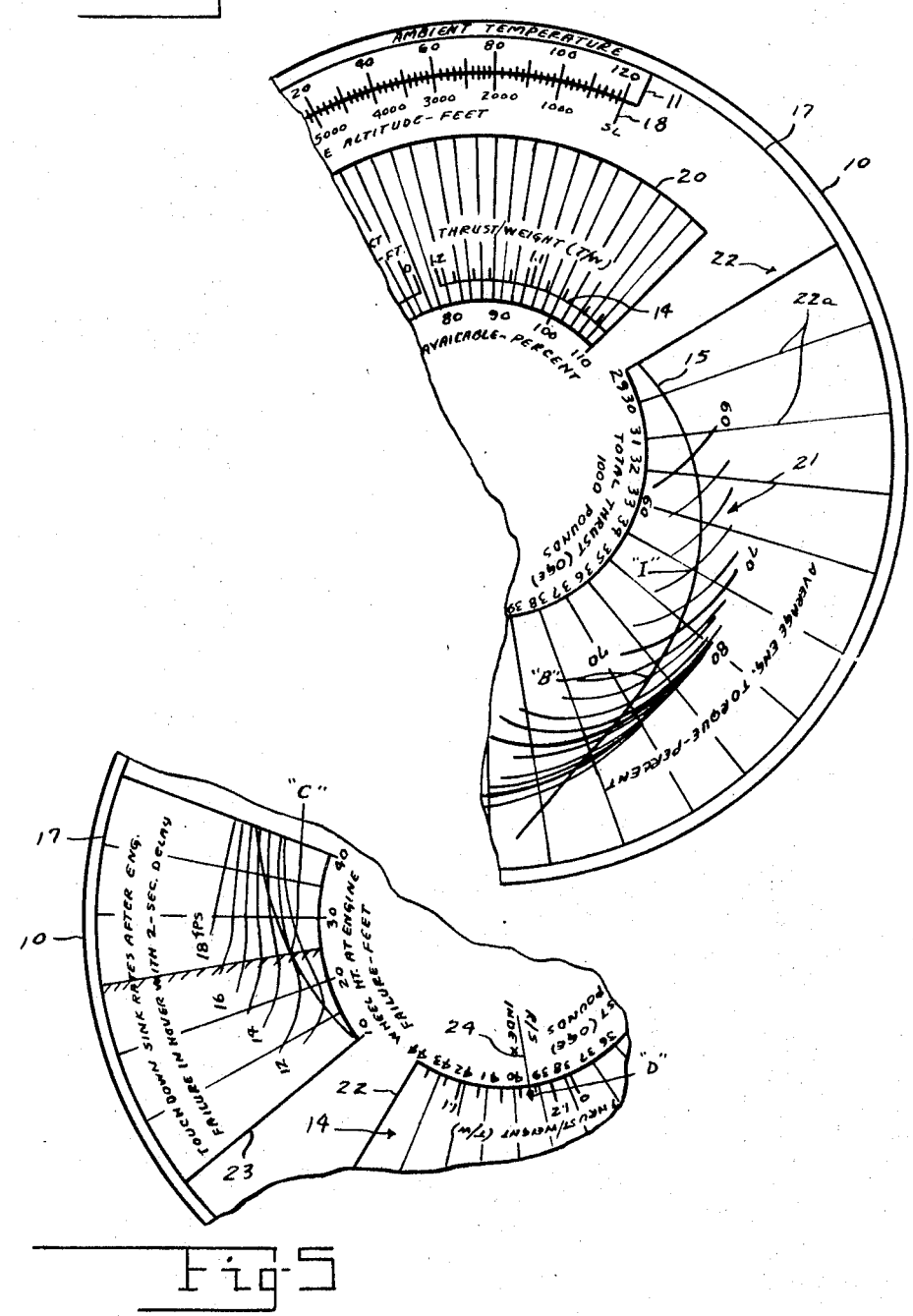

Sept. 15, 1970  R. K. RANSONE  3,528,605
HOVER PERFORMANCE COMPUTER
Filed March 25, 1968  5 Sheets-Sheet 5
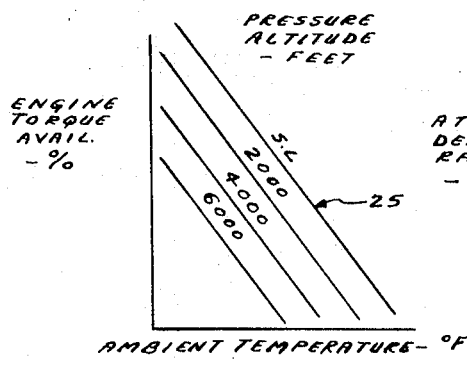
Fig-10
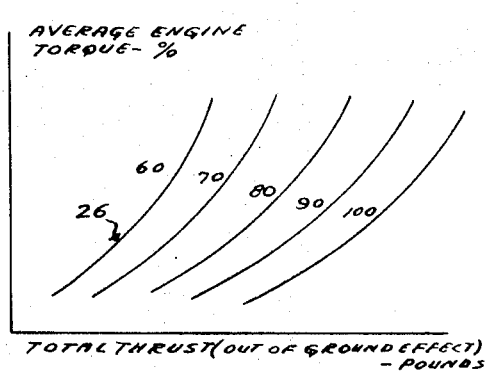
Fig-11
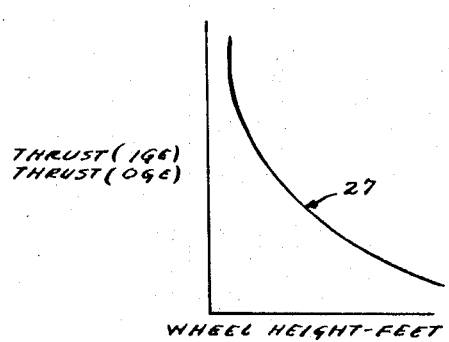
Fig-12
Fig-13
INVENTOR.
ROBIN K. RANSONE
BY
ATTORNEY
Arthur R Parker
AGENT

United States Patent Office 3,528,605
Patented Sept. 15, 1970

3,528,605
HOVER PERFORMANCE COMPUTER
Robin K. Ransone, Lancaster, Calif. 93534
Filed Mar. 25, 1968, Ser. No. 715,833
Int. Cl. G06c *3/00, 27/00*
U.S. Cl. 235—78                    9 Claims

ABSTRACT OF THE DISCLOSURE

A transparent overlay disc element of a V–STOL aircraft flight computer is inscribed with pressure altitude, engine torque, thrust and touchdown sink rate scales and is concentrically arranged for adjustment in rotation to various positions relative to a white base disc element inscribed with a pressure altitude-temperature grid, and temperature, ground effect, and thrust/weight ratio scales for determining performance data regarding hovering characteristics of V–STOL type aircraft.

BACKGROUND OF THE INVENTION

This invention relates generally to the field of aircraft flight computers and, in particular, to aircraft computers specifically applicable to determine the hovering characteristics of V-STOL type aircraft.

The V-STOL type aircraft has long been under development and investigation to determine the application thereof to perform certain civilian and military missions. Naturally, the performance of such aircraft both in straight-and-level flight and, particularly, the performance characteristics thereof while engaged in hovering flight is of considerable interest. In this regard, hovering characteristics data obtained from previously-tested V-STOL aircraft have been compiled on charts and graphs which, however, have proven awkward to use by the test pilot during the test flight of said aircraft. To eliminate the obvious disadvantage inherent in these previous attempts to use such charts and graphs during actual flight-testing, the computer of the present invention was specifically developed and it offers many improvements in quickly presenting accurate data to the test pilot that is pertinent to the testing of V-STOL aircraft, as will become apparent from the following summary and detailed description.

SUMMARY OF THE INVENTION

A principal object of the present invention, therefore, resides in a uniquely-developed flight computer for quickly determining the engine power available in a V-STOL type aircraft for given pressure altitude and ambient temperature conditions.

A further object of the invention is in the utilization of an improved aircraft flight computer providing a novel and simple means for automatically computing the propeller thrust available to the V-SOL aircraft being tested for a given engine power.

A still further object of the invention resides in a novel aircraft flight computer having uniquely-arranged propeller thrust and engine power scale means adjustable relative to each other and to an improved pressure altitude-temperature grid means in a simplified manner to thereby ensure the accurate and quick determination of essential flight data, such as the torque required to hover at any weight and altitude and temperature conditions.

An additional object of the invention is in a new and improved flight data computer that is greatly simplified in that it utilizes a minimum of moving parts and incorporates pressure altitude, ambient temperature, torque and thrust scales in novel combination with a lift augmentation due to ground effect, and touchdown sink rate scales for combined use in determining the aircraft characteristics during hover and after engine failure in hover.

Other objects and advantages of the invention will become readily apparent from the following summary and description, in which:

BRIEF DESCRIPTION OF THE DRAWINGS

FIG. 2 is a second top view, representing the overlay disc element adapted to be used with the base disc element of FIG. 1, and illustrating the pressure altitude, torque available, average engine torque, total thrust, and touchdown sink rate scales used in conjunction with the scales inscribed on said base disc element to thereby compute the hover performance of a V-STOL type aircraft;

FIGS. 4–9, inclusive, respectively represent fragmentary, broken-away views of the pertinent sectors of the present computer that are respectively involved in the adjustment of the invention in relative position to the various steps required in computing the hovering characteristics of a selected V-STOL type aircraft; and FIGS. 10–13, inclusive, respectively represent in schematic form graphical plots illustrating the basic parameters involved in, and which have an effect on, the fundamental flight data normally included in determining the essential flight characteristics of a V-STOL aircraft, particularly while in hover flight.

DESCRIPTION OF THE PREFERRED EMBODIMENT

Figure 1:
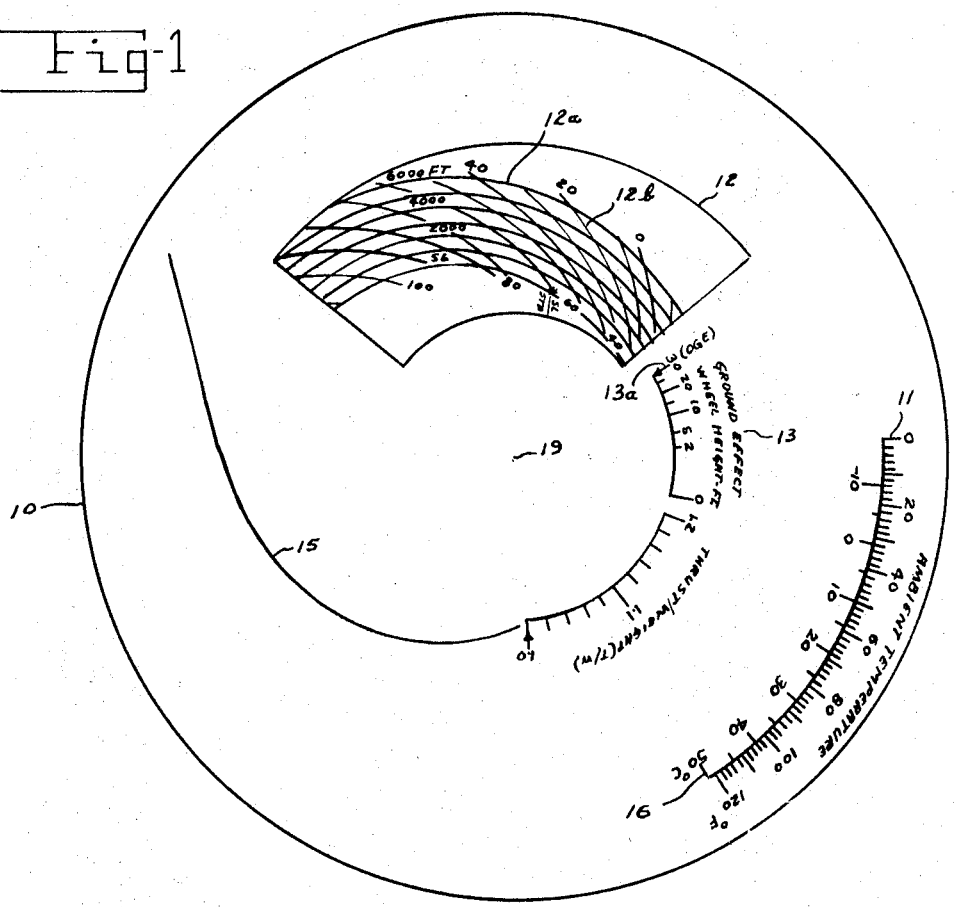
FIG. 1 is a top view of the base disc element used with the present computer, and illustrating the ambient temperature, the ground effect and thrust/weight scales, and the pressure altitude-temperature grid and novel spiral-shaped guideline used in unique manner to compute certain essential flight data involved in hover flight.

The flight data computer of the present invention consists essentially of two concentric disc-shaped elements movably-mounted relative to each other, and including a white base disc element at 10 (FIG. 1) and a partially transparent overlay disc element at 17 (FIG. 2). Base disc element 10 is seen particularly in FIG. 1 as being inscribed with an ambient temperature scale 11 graduated in degrees F; a pressure altitude-ambient temperature grid scale indicated at 12 as including a first series of curved lines at 12a representing variations in pressure altitude from sea level to 6000 feet, and a second series of intersecting curved lines at 12b representing variations in ambient temperature from 0–110° F.; ground effect lift augmentation and thrust/weight ratio scales respectively at 13 and 14; and a unique spiral-shaped guideline at 15, the novel purpose of which will be explained in detail hereinafter with particular reference to FIG. 3. A temperature conversion scale is also provided at 16 for converting degrees C. to degrees F. The aforesaid ground effect lift augmentation scale 13 is further labeled with a WHEEL HEIGHT notation at 13a which varies from 0–30 feet, as shown.

In FIG. 2, the previously-mentioned overlay disc element 17 is clearly illustrated as incorporating a number of inscribed scales formed into several transparent "windows," as shown, and including a pressure altitude scale 18, a torque available scale at 20; an average engine torque scale window indicated generally at 21; a total thrust scale 22 measured in thousing pounds as illustrated; and a touchdown sink rate scale window 23 graduated in feet per second. A rate of sink, R/S index is also provided at 24 for a specific purpose to be described hereinafter in detail. The various parameters involved in the use of the scales described above and the specific relative positioning and, therefore, cooperation required therebetween to thereby compute the desired flight data will now be described hereinafter in detail with particular reference to the graphs of FIGS. 10–13, inclusive.

As seen in the graph of FIG. 10, data regarding the POWER AVAILABLE is determined from a plot on the ordinate of both ambient TEMPERATURE AND PRESSURE ALTITUDE (PA) vs. maximum power ENGINE TORQUE AVAILABLE plotted on the abscissa. The aforesaid PRESSURE ALTITUDE is plotted in the form of a series of altitude lines, indicated generally at 25 and varying from sea level to 6000 feet. These PA lines 25 are represented in equivalent form by the PA scale 18 inscribed on the previously-described overlay disc element 17 of the present computer, whereas, the AMBIENT TEMPERATURE is similarly represented as the temperature scale at 11 inscribed on the base disc element 10. Actually, to determine the ENGINE TORQUE which should be available for a properly operating engine, the present invention incorporates the previously-described TORQUE AVAILABLE scale in the form of the window 20 of the overlay disc element 17, which window 20 is centered over a combined pressure altitude-ambient temperature grid scale 12, previously mentioned with specific reference to the previous description of FIGS. 1 and 2. The separate temperature and PA scales 11 and 18 are used in performing the second step in operating the present computer to compute or determine the TOTAL THRUST (OGE), as will be explained hereinafter in more detail during the description of the operation of the present invention.

The above-referred to ambient temperature and pressure altitude scales 11, 18 are both simple linear angular scales and are based on the following simplified density ratio equation given below:

$$\sigma = 1.00 - .0017\ (T - H)$$

In the above equation, the atmospheric density ratio $(\sigma)$ is defined as a simplified function of the pressure altitude (H) in feet, and ambient temperature (T) in degrees F. for the range needed. Variations in these parameters of temperature and altitude are provided for in the present computer by means of the previously described temperature and altitude scales 11 and 18. For this purpose and to provide a simplified means of effecting relative positioning between given operating conditions of temperature and altitude, the temperature scale 11 is made arcuate in form and is positioned immediately adjacent the circumference of the base disc element 10, while the altitude scale 18 is likewise made arcuate in form and is positioned just inwardly of, and immediately adjacent to, said temperature scale 11 for direct alignment therewith. In further regard to the above noted density ratio equation, it is noted that at any angular orientation of the base disc element 10 and the overlay disc element 17, adjacently-positioned temperatures and altitudes will result in the same density ratio. Therefore, while this could be read out on a different scale, it is not needed and is thus not shown.

In FIG. 11, the parameters inherent in determining the PROPELLER THRUST are shown in their correct relationship, with the TOTAL THRUST (OGE, i.e., out-of-ground effect) being plotted as the abscissa vs. the density ratio, $(\sigma)$ on the ordinate for a complete range of AVERAGE ENGINE TORQUE. The latter is plotted on the ordinate in the form of a series of curves, indicated generally at 26, and ranging in value from 60–100%. In this connection, the correct density ratio $(\sigma)$ is actually inherently set into the inventive compuer by means of the relative positioning between the previously described AMBIENT TEMPERATURE AND PRESSURE ALTITUDE and is indicated through the position of the previously noted spiral-shaped, guideline 15 inscribed on the base disc element 10. The total thrust (OGE) and average engine torque are respectively represented in the inventive computer by the scales at 22 and 21, both inscribed on the overlay disc element 17.

With further regard to guideline 15, it is noted that the actual shape of this element may be changed arbitrarily in that it should be so adjusted relative to the AVERAGE ENGINE torque lines to enable sufficient separation therebetween consistent with the legibility thereof. Also, the TOTAL THRUST (OGE) scale 21 consists of a logarithmic angular scale and is also utilizable in the thrust/weight ratio and ground effect calculations, as will be described hereinafter in detail with particular reference to FIG. 3. For this purpose, the aforesaid TOTAL THRUST (OGE) is measured in thousand pounds, as hereinbefore noted (see FIG. 2) and consists of a series of straight lines at 22a, which vary at one thousand pound intervals and which are marked with indicia varying from 29–44, inclusive. Certain of the lines 22a are made to intersect the previously noted AVERAGE ENGINE TORQUE scale 21 which actually consists of a plurality of curved lines at 21a (which are equivalent to the curves 26 in FIG. 11) which are graduated in percentage and vary from 60–100% at 2% intervals with indicia marked at every 10% interval.

The GROUND EFFECT LIFT AUGMENTATION scale 13, previously mentioned relative to the description of FIG. 1, includes a portion labeled WHEEL HEIGHT, and varying in value from 0–30 feet and, as particularly seen in the graph of FIG. 12, illustrates the decrease in the GROUND EFFECT LIFT AUGMENTATION as the wheel height is increased. This decrease is evidenced by the curve indicated at 27 in FIG. 12 and the WHEEL HEIGHT is represented by the scale indicated by the reference numeral 13a, as noted hereinbefore on the base disc element 10 (FIG. 1), and is plotted as the abscissa vs. the THRUST (IGE)/THRUST (OGE) on the ordinate. It is used to compute the hover weight of the V-STOL aircraft under test at a particular WHEEL HEIGHT and for a given T/W ratio, as will be explained hereinafter in more detail.

The THRUST/WEIGHT (T/W) ratio scale 14, previously described with reference to FIG. 1 as being inscribed on the base disc element 10, is graduated in numbers from 1.0 to 1.2 and is incorporated on the base disc element to enable the weight to be calculated for various T/W ratios, once the propeller thrust is known. The scale 14 is, in addition, a logarithmic scale and is arranged to provide a slide rule type of division operation with the existing TOTAL THRUST (OGE) scale 22.

The varable factors incorporated in the previously described TOUCHDOWN SINK RATES (R/S) scale 23 (FIG. 2), and their specific relationship to each other are shown more clearly in the view of FIG. 13, which represents the THRUST/WEIGHT (T/W) ratio scale plotted as the ordinate and represented at 14 on the base disc element 10 vs. the WHEEL HEIGHT at ENGINE FAILURE plotted as the abscissa and found on the overlay disc element 17 at the reference numeral 23a, for various TOUCHDOWN SINK RATES found at the scale indicated by the reference numeral 23 in the overlay disc element view of FIG. 2. In this regard, the scale 23 incorporates a first series of straight, divergent lines at 23a representing variations in wheel height at engine failure of from 10–40 feet, and a second series of intersecting curved lines at 23b representing variations in TOUCHDOWN SINK RATES of from 12–18 feet per second (f.p.s.). These curved "touchdown sink rate" lines are represented in the aforesaid FIG. 13 at the reference numeral 28.

The R/S Index mark at 24 (see FIGS. 2 and 3) is inscribed on the overlay disc element 17 in order to properly index the guideline 15 and thereby represent the THRUST/WEIGHT (T/W) ratio at which the said R/S Index is set. In the present instance, it is located at a TOTAL THRUST (OGE) of 39,200 pounds. However, this is a mere coincidence, since there is no specific relationship between the R/S Index mark 24 and the thrust. Instead, the relationship is the ratio of pure THRUST/WEIGHT.

Figure 3:
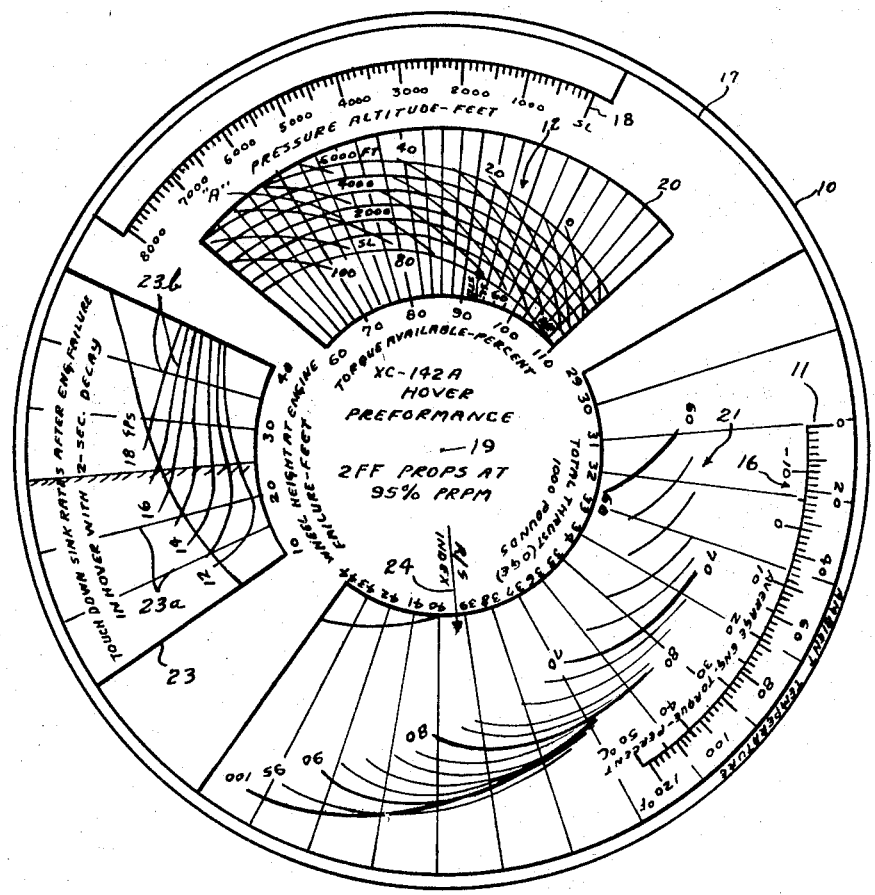
FIG. 3 is a third top view, illustrating the overlay disc element of FIG. 2 assembled in concentric and rotatable relation to the base disc element of FIG. 1, but with the ground effect and thrust/weight scales omitted from the latter element, and further showing the correct relative adjustment between the two disc elements in order to determine the available engine torque for a given pressure altitude and ambient temperature condition.

Referring specifically to FIG. 3 of the drawings, the overlay disc element 17 is shown assembled to the base disc element 10 and adjusted about the common pivot at 19 to a position where the window of its TORQUE AVAILABLE scale 20 is centered directly over the altitude-temperature grid scale 12 inscribed on the base disc element 10. In this manner, the engine torque that should be available for a properly operating engine may be determined for particular operating conditions of pressure altitude and ambient temperature. Thus, if for example, the V–STOL aircraft to be tested is to operate at a pressure altitude (PA) of 2000 feet and an ambient temperature of 80° F., a TORQUE AVAILABLE reading of 74% may be found, as the first operating step in using the present computer, on the line of the torque available scale 20 which is aligned directly over the intersection between the 2000 feet PA curved line 12a and the 80° curved temperature line 12b found on the altitude-temperature grid scale 12 of the base disc element 10. This intersection is designated by the point "A" in FIG. 3. Note, for the actual engine, a power check at 95% p.r.p.m. (propeller r.p.m.) is advised and the average torque available can then be set to intersect the actual altitude-temperature lines on the grid scale 12. The referred torque at the point marked SL STD (*) on said scale can then be noted and used to index the actual engine for other altitude and temperature operating conditions.

In operating the present computer to the next or second step to thereby determine the out-of-ground effect TOTAL THRUST, or in other words, the TOTAL THRUST (OGE) of the propeller, at an operating condition of 2000 feet PA and an 80° F. ambient temperature, the ENGINE TORQUE AVAILABLE is initially determined, as indicated above, to be 74%. Next, the 2000 feet PRESSURE ALTITUDE is set at the 80° F. AMBIENT TEMPERATURE by appropriately adjusting the PA scale 18 on the overlay disc element 17 to align the 2000 feet reading thereon directly opposite the 80° F. temperature mark on the ambient temperature scale 11 of the base disc element 10, as is illustrated in the second step view of FIG. 4. A TOTAL THRUST (OGE) of 36,400 pounds is then read on the total thrust scale 22 directly opposite the intersection between the spiral-shaped guideline 15 and the curved line AVERAGE ENGINE TORQUE scale 21 representing the already found TORQUE AVAILABLE of 74%, or in other words, at the point "B" in FIG. 4. The TOTAL THRUST in thousand pounds is then determined by interpolating to obtain the previously noted reading of 36,400 pounds.

Figure 6:
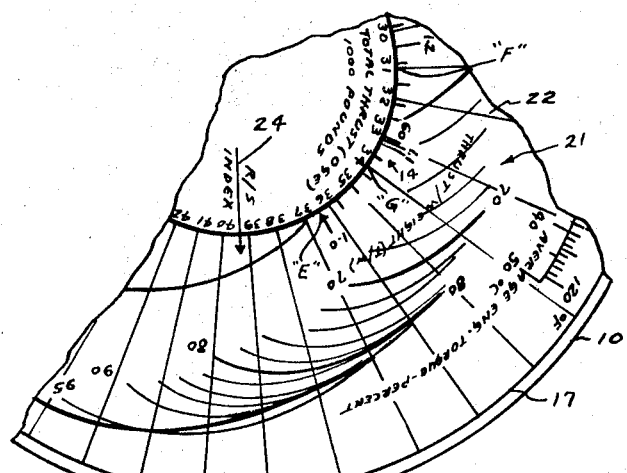

The present computer is further designed to determine the TOUCHDOWN SINK RATE, if the engine of the V–STOL aircraft under test should fail while the aircraft is, for example, in hover at 25 feet, by setting the 25 feet line on the WHEEL HEIGHT at ENGINE FAILURE scale 13 inscribed on the overlay disc element 17 initially at the point of its intersection with a desired or selected touchdown sink rate of 12 f.p.s. directly over and in alignment with the spiral guideline 15, as is illustrated at the point "C" in the third-step view of FIG. 5. The "12 f.p.s." figure is utilized in this example, because it represents the design maximum touchdown sink rate allowable for the landing gear of a particular V–STOL aircraft under investigation. A THRUST/WEIGHT ratio (T/W) equal to 1.174 is then read at the R/S Index 24 (see point "D" in FIG. 5). The previously found TOTAL THRUST (OGE) of 36,400 pounds is next set at a T/W equal to 1.0, or in other words, at the index arrow marked 14a on the T/W scale 14, as specifically shown in the fourth step view of the FIG. 6 (note point "E"), and a weight, W, equal to 31,000 pounds may then be read on the total thrust scale 22 at the point marked "F" directly opposite the previously-determined value of T/W equal to 1.174. If the actual weight of the aircraft involved is greater than the above found 31,000 pounds, as for example, 34,000 pounds, a T/W equal to 1.070 is read at the point "G" on the T/W scale 14 directly opposite this 34,000 pound weight found on the total thrust scale 22. By setting the R/S Index 24 at the aforesaid value of T/W equal to 1.070, the actual TOUCHDOWN SINK RATE is then read as being equal to 15.3 f.p.s. for an engine failure in hover flight at 25 feet, on the TOUCHDOWN SINK RATES scale 23 at the point of intersection between the 25 feet WHEEL HEIGHT AT ENGINE FAILURE line and the spiral guideline 15, or in other words, at the point "H" in the fifth step view of FIG. 7.

With the above mentioned aircraft weight of 34,000 pounds, the percent of ENGINE TORQUE REQUIRED may be computed by again adjusting the PRESSURE ALTITUDE scale 18 on the overlay disc element 17 in position relative to the AMBIENT TEMPERATURE scale 11, so that the given 2000 feet pressure altitude and 80° F. temperature operating conditions are aligned with each other, as is also illustrated in the previously referred to FIG. 4. Then, by first selecting the straight line on the TOTAL THRUST scale 22, representing a weight, W, equal to 34,000 pounds and, second, accurately interpolating the point between the adjacently positioned curved lines representing the AVERAGE ENGINE TORQUE on the scale 21 at which the selected 34,000 pound weight line intersects the spiral guideline 15, the ENGINE TORQUE REQUIRED FOR HOVER (OGE) at the aforesaid 34,000 pound weight, may be read as 66%. This point is marked at "I" in the aforesaid FIG. 4.

Figures 8, 9:
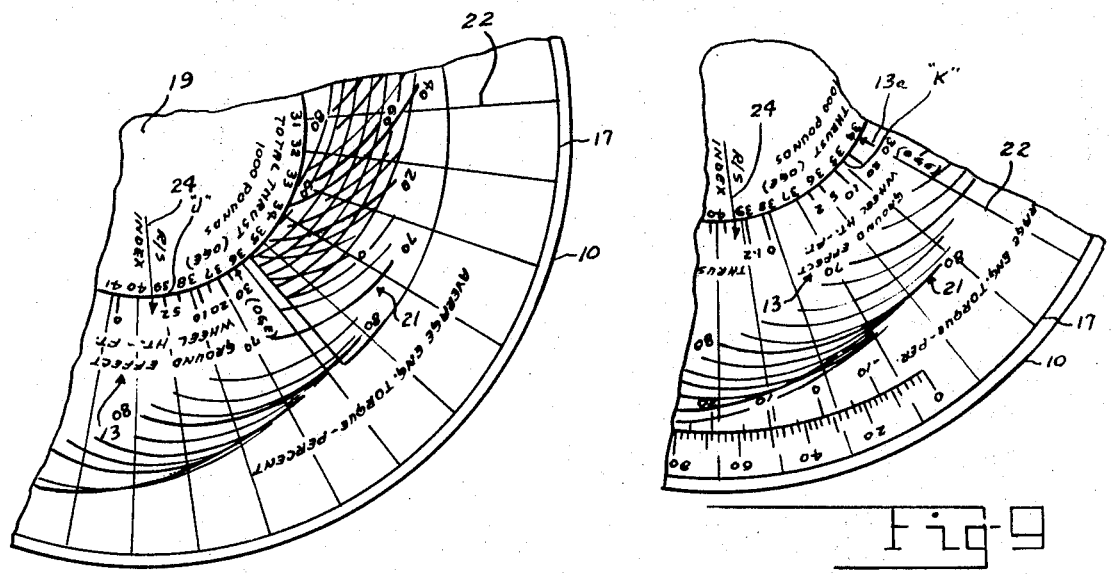

Finally, the instant invention may be also easily utilized to compute the requirement for HOVER IN GROUND EFFECT (IGE) as follows: Given a 36,400 pound TOTAL THRUST (OGE), this value on the TOTAL THRUST scale 22 is set, or adjusted to a position directly aligned with the index arrow marked 13a, as seen in the fragmentary view of FIG. 8, and a hover weight equal to 39,000 pounds may be read, for example, on the TOTAL THRUST scale 22 at the point marked "J," for a WHEEL HEIGHT equal to 2 feet, which would be for a THRUST/WEIGHT ratio or T/W equal to 1.00 for the previously found total thrust of 36,400 pounds for an engine torque available of 74%. Therefore, with the previously given weight of 34,000 pounds and a T/W equal to 1.070 corresponding thereto, it can be determined by use of the present computer that a given V–STOL aircraft could, for example, actually hover at 15 feet with a total weight of 35,000 pounds. This is shown by the view of FIG. 9, in which the above noted 34,000 pounds weight found on the TOTAL THRUST scale 22 is adjusted to a position in direct alignment with the index 13a of the WHEEL HEIGHT scale 13, and a wheel or HOVER HEIGHT of 15 feet may then be read on the scale 13 at a position thereon that is directly aligned with the 35,000 pound graduation on said TOTAL THRUST scale. This point is marked at the point "K" in the aforesaid FIG. 9.

It is noted that the instant invention was designed for direct application to a specific V–STOL aircraft and, accordingly, the foregoing information is directly applicable to that aircraft. However, the present computer could be easily modified for appropriate use in connection with other types of V–STOL aircraft, as well as with helicopters and other propeller driven VTOL aircraft.

While a preferred embodiment of the invention has been dsecribed, it is apparent that additional modifications and changes may be made without departing from the true spirit and/or scope of the invention, as defined hereinafter in the accompanying claims.

I claim:
1. An aircraft flight data computer for determining the hovering characteristics of a V–STOL–type aircraft, comprising: a first, base computer element having a separate ambient temperature scale inscribed thereon adjacent to one portion of the circumference thereof and a combined pressure altitude-ambient temperature grid scale inscribed thereon at a location on a second portion thereof in spaced-apart relation to said separate ambient temperature scale and being further oriented inwardly of the circumference thereof and consisting of a first and second series of intersecting curves resectively representing variations in ambient temperature and pressure altitude; and a second, overlay computer element mounted for rotation movement over and relative to said first, base computer element about a common pivot center and including at least one transparent window positioned inwardly of the circumference of said second, overlay computer element and inscribed with a separate engine torque available scale initially adustable by the relative movement of said second, overlay computer element to a first position in which said window is centered directly over the combined pressure altitude-ambient temperature grid scale on said base computer element; said engine torque available scale having a plurality of straight, divergent torque lines varying in value from 60–110% and oriented to respectively intersect with said pressure altitude-ambient temperature grid scale to thereby determine the percent of engine torque available by the reading at the intersection of the respective intersecting curves on said grid scale representing a given aircraft operating condition of pressure altitude and ambient temperature; said second, overlay computer element further having a separate pressure altitude scale inscribed thereon and incorporating a second transparent window of arcuate form and disposed thereon along one portion of the circumference thereof immediately adjacent the inner, circumference of said separate ambient temperature scale on said base computer element, said separate pressure altitude scale and its transparent window being adjustable by the rotational movement of said second, overlay computer element on said first, base computer element to thereby align a given pressure altitude reading thereon with a given ambient temperature reading on said separate ambient temperature scale of said first, base computer element in preparation for the subssquent computation of essential flight data; said first and second-named computer elements each being further inscribed with propeller thrust-determining means including a primary, thrust-indicating scale portion located on said first-named computer element and extending from a first end position thereon substantially inwardly of the circumference thereof and substantially spaced from said combined pressure altitude-ambient temperature grid scale to terminate at a second end position nearly adjacent the circumference of said first-named computer element; and a combined, secondary, engine torque- and thrust-indicating scale portion inscribed on a third transparent window arcuate in shape and incorporated in said second-named computer element at a position thereon extending at one end thereof from a portion of the circumference thereof inwardly towards the pivot center of said second-named computer element and further oriented substantially adjacent to said separate engine torque available scale on one side thereof; said second-named computer element being automatically adjusted, by the previously-accomplished alignment between the given operating conditions of pressure altitude and ambient temperature, to simultaneously automatically adjust said combined, secondary engine torque- and thrust-indicating scale portion inscribed thereon to a point of intersection with said primary thrust-indicating scale portion inscribed on said first-named, computer element and corresponding with the previously-determined engine torque available and automatically providing a reading at the said point of intersection of the total propeller thrust of the aircraft on said combined engine torque- and thrust-indicating scale portion.

2. In an aircraft flight data computer as in claim 1, wherein said primary, thrust-indicating scale portion comprises a relatively elongated and substantially arcuate, total thrust-indicating guideline scale element, and said combined, secondary, engine torque- and thrust-indicating scale portion comprises a separate average engine torque scale portion consisting of a series of curves extending partially inwardly of said separate ambient temperature scale, in combination with a separate total thrust scale portion consisting of a plurality of converging lines extending inwardly towards the computer pivot center and intersecting said series of curves, said combined average engine torque and total thrust scale portions being adjusted, by the previous relative movement between said first and second-named computer elements to thereby align the given operating conditions of pressure altitude and ambient temperature, to a position of intersection between said guideline scale element inscribed on said first-named computer element and the value on said average engine torque scale portion corresponding to the said previously-determined point of intersection on said second-named computer element-engine torque available scale, representing the engine torque available for the given operating conditions of pressure altitude and ambient temperature, and further being, in its adjusted position, in alignment with said total thrust scale portion and thereby indicating the total propeller thrust.

3. In an aircraft flight data computer as in claim 2, said first-named, computer element further incorporating an arcuate-shaped, thrust/weight (T/W) ratio scale inscribed thereon inwardly of, and interposed between said separate ambient temperature scale and the pivot center of said computer elements and terminating at one end positioned in substantially spaced-apart relation to said combined pressure altitude-ambient temperature grid scale and at an opposite end disposed substantially adjacent the first end position of said guideline scale element, and adapted to determine the permissible hover weights and touchdown sink rates after engine failure, said thrust/weight ratio scale being further equipped with a first index mark at one end position thereon substantially adjacent to said first end position of said guideline scale element and in direct alignment with a T/W value equal to 1.00: and said second-named, computer element further including a combined touchdown sink rates and wheel height at engine failure scale inscribed on a fourth transparent window arcuate in configuration and disposed in said second-named, computer element at a position thereon extending between said combined, secondary, engine torque- and thrust-indicating scale portion and said separate engine torque available scale, and incorporating a series of intersecting straight divergent sink rate lines and wheel height curved lines and having a preselected point of intersection therebetween corresponding to a representative wheel height at engine failure and a desired touchdown sink rate and being initially adjustable with the relative movement of said second-named, computer element to an aligned position with said relatively elongated, primary thrust-indicating scale portion inscribed on said first-named computer element; and second-named computer element having a second, index mark inscribed thereon adjacent said total thrust scale portion and said thrust/weight ratio scale, said second, index mark being automatically adjustable with the said initial adjustment of said combined touchdown sink rates and wheel height at engine failure scale to an aligned position with a first value of T/W on said thrust/weight ratio scale; said total thrust scale portion being thereafter adjusted to align the previously-determined value of total thrust appearing thereon directly opposite said first, index mark inscribed on the thrust/weight ratio scale of said first-named computer element; said second, index mark of said second-named computer element being thereby adjusted to a second value of T/W corresponding to the actual weight of the aircraft, said second, index mark being thereafter further adjusted to an aligned position with said second T/W ratio value to thereby simultaneously adjust said combined touchdown sink rates and wheel height after engine failure scale to intersect with said total thrust-indicating scale means inscribed on said first-named, computer element at a position thereon corresponding to the computed touchdown sink rate for an engine failure while the aircraft is in hover flight at a given wheel height.

4. In an aircraft flight data computer as in claim 3, wherein said computer further includes a separate and combined ground effect lift augmentation and wheel height scale inscribed on said first-named computer element inwardly of the circumference thereof and intermediately disposed between the said thrust/weight ratio and combined pressure altitude-ambient temperature grid scales and containing a third, index mark positioned at one end of said ground effect lift augmentation and wheel height scale substantially adjacent one end of said combined pressure altitude-ambient temperature grid scale and adapted to determine the hover-in-ground effect flight data for the selected V-STOL aircraft; said total thrust scale portion being further adjustable in position to thereby align the previously-computed total thrust with said third, index mark to thereby determine the permissible in-ground-effect hover weight for the aircraft found on said total thrust scale portion directly opposite a given wheel height on said combined ground effect life augmentation and wheel height scale.

5. In an aircraft flight data computer as in claim 2, wherein said primary, thrust-indicating scale portion of said first-named computer element comprises a spiral indexing line.

6. In an aircraft flight data computer as in claim 3, wherein said propeller thrust-determining means comprises a spiral guideline located adjacent said thrust/weight (T/W) ratio scale at an inner end thereof located substantially inwardly of the circumference of said first-named computer element, and adjustable in position with the movement of said second-named computer element relative thereto to thereby intersect with the combined secondary engine torque and thrust-indicating scale portion of said thrust-determining means inscribed on said second-named computer element and indicating the computed total thrust at the position thereof corresponding to the previously-determined engine torque available.

7. In an aircraft flight data computer as in claim 1, wherein said propeller thrust-determining means comprises a combined scale inscribed on said second-named computer element and including an average engine torque scale portion extending from a first position nearly adjacent the circumference in a radial direction towards the center thereof and incorporating a first plurality of curved torque lines varying from 60-100% and a total thrust scale portion extending inwardly from one portion of the circumference thereof and incorporating a second plurality of diverging straight, total thrust lines intersecting with said torque lines; and a spiral guideline inscribed on said first-named computer element and extending from an inner end portion intermediately positioned between the circumference and the pivot center thereof to an outer end portion terminating nearly adjacent the circumference thereof; said spiral guideline being adjustable by the initial relative adjustment between said pressure altitude and ambient temperature scales to an intersecting position with both of said average engine torque and total thrust scale portions, said adjusted position corresponding to the previously-computed value of the engine torque available and appearing at said intersecting position and thereby providing a measure of the total thrust by the value appearing on said total thrust scale at the same point of intersection.

8. In an aircraft flight data computer as in claim 7, wherein said computer further includes a thrust/weight ratio scale inscribed on said first-named computer element with one end and a first index mark at a T/W value equal to 1.00 oriented thereon adjacent the inner end portion of said spiral guideline; and a touchdown sink rate and wheel height at engine failure scale inscribed on said second-named computer element at a position thereon extending inwardly from the circumference thereof and intermediately arranged between said engine torque available, and combined average engine torque and total thrust scales and incorporating a plurality of curved sink rate lines and intersecting straight wheel height lines adjustable in position with the movement of said second-named computer element to thereby align a preselected point of intersection appearing thereon with said spiral guideline, said total thrust scale having a second index mark being thereafter automatically adjusted to an initial position in direct alignment with said thrust/weight ratio scale to thereby indicate a first value of the T/W ratio, and thereafter being subsequently adjustable to align the previously-computed value of the total thrust to a position opposite the second value of T/W equal to 1.00 of said first, index mark to thereby indicate the permissible hover weight apearing on said total thrust scale directly opposite the first value of the T/W ratio.

9. In an aircraft flight data computer as in claim 8, wherein said first, computer element further includes a ground effect scale combined with a second wheel height scale and inscribed thereon at an intermediate position substantially adjacent to, and interposed between the said thrust/weight ratio and combined pressure altitude-ambient temperature grid scales and further incorporating a third index mark at one end portion thereof, and said total thrust scale is adapted to be adjustable relative to said combined ground effect and wheel height scale to a position whereby the precomputed total thrust value appearing thereon is directly aligned with said third, index mark, the value thereafter appearing on said total thrust scale directly opposite a selected wheel height on said combined scale thereby being equal to the permissible in-ground-effect, hover weight for the selected wheel height of the aircraft.

References Cited
UNITED STATES PATENTS

| | | | |
|---|---|---|---|
| 2,342,710 | 2/1944 | Vosseller | 235—61 |
| 3,059,848 | 10/1962 | Moen | 235—83 X |
| 3,084,858 | 4/1963 | Clapp | 235—84 |
| 3,220,644 | 11/1965 | Gaudio | 235—78 |

RICHARD B. WILKINSON, Primary Examiner

STANLEY A. WAL, Assistant Examiner

U.S. Cl. X.R.

235—88